United States Patent
Iremonger et al.

(10) Patent No.: US 11,078,399 B2
(45) Date of Patent: Aug. 3, 2021

(54) DRY BLEND PRE-FLUSH AND SPACER PACKAGE AND METHOD FOR MIXING AND INJECTING A PRE-FLUSH AND SPACER ON-THE-FLY TO CLEAN A SUBTERRANEAN WELL

(71) Applicant: SANJEL ENERGY SERVICES INC., Calgary (CA)

(72) Inventors: Simon Iremonger, Calgary (CA); Jared Taylor, Calgary (CA)

( * ) Notice: Subject to any disclaimer, the term of this patent is extended or adjusted under 35 U.S.C. 154(b) by 272 days.

(21) Appl. No.: 16/456,498

(22) Filed: Jun. 28, 2019

(65) Prior Publication Data

US 2020/0231861 A1 Jul. 23, 2020

Related U.S. Application Data

(60) Provisional application No. 62/794,741, filed on Jan. 21, 2019.

(51) Int. Cl.
| | | |
|---|---|---|
| *C09K 8/40* | (2006.01) | |
| *E21B 37/00* | (2006.01) | |
| *C09K 8/42* | (2006.01) | |
| *C09K 8/52* | (2006.01) | |
| *E21B 33/13* | (2006.01) | |

(52) U.S. Cl.
CPC .............. *C09K 8/40* (2013.01); *C09K 8/42* (2013.01); *C09K 8/424* (2013.01); *C09K 8/52* (2013.01); *E21B 33/13* (2013.01); *E21B 37/00* (2013.01)

(58) Field of Classification Search
CPC ........... E21B 33/13; E21B 37/00; C09K 8/40; C09K 8/42; C09K 8/52; C09K 8/424
See application file for complete search history.

(56) References Cited

U.S. PATENT DOCUMENTS 2,875,831 A * 3/1959 Martin ................. E21B 43/164
166/266
3,849,316 A 11/1974 Motley et al.
(Continued)

FOREIGN PATENT DOCUMENTS

CA 3065049 A1 6/2020
CN 107 325 798 11/2017

*Primary Examiner* — Yong-Suk (Philip) Ro
(74) *Attorney, Agent, or Firm* — Heer Law; Christopher D. Heer; Larissa Leong

(57) ABSTRACT

The present invention relates to a dry blend one-part pre-flush and spacer package for forming a water-based pre-flush and spacer on-the-fly for use in a subterranean well and a method of mixing a pre-flush and spacer on-the-fly for use in a subterranean well. The dry blend pre-flush and spacer package includes an anionic surfactant, a builder compound, and optionally, a defoamer, a dispersant calcium chelator, a density modifying agent, a viscosifying agent such as a solid, and preferably rapidly hydrating, gellant, salt and one or more lost-circulation materials. The dry blend pre-flush and spacer package is mixed on-the-fly with water at the subterranean well site to form the pre-flush and spacer at a pre-selected density and the pre-flush and spacer, when pumped into the subterranean well by a pressure pumper, converts the well from an oil-wet or substantially non-water-wet condition to a substantially water-wet condition.

32 Claims, 2 Drawing Sheets providing a dry blend pre-flush and spacer package 300, the dry blend pre-flush and spacer package comprising an anionic surfactant, a builder compound, a defoamer, a dispersant calcium chelator, a density modifying agent, a solid gellant and one or more lost-circulation materials

↓ mixing the dry blend pre-flush and spacer package on-the-fly with water to form the pre-flush and spacer at a pre-selected density 320

↓ and injecting the pre-flush and spacer into the well 340 while the mixing step continues, converting the well from an oil-wet or substantially non-water-wet condition to a substantially water-wet condition.

(56) References Cited

U.S. PATENT DOCUMENTS

| | | | | |
|---|---|---|---|---|
| 4,588,032 A | * | 5/1986 | Weigand | C09K 8/424 |
| | | | | 166/291 |
| 5,418,197 A | * | 5/1995 | Brandt | C04B 35/111 |
| | | | | 501/89 |
| 5,789,352 A | * | 8/1998 | Carpenter | C09K 8/40 |
| | | | | 507/209 |
| 5,866,517 A | | 2/1999 | Carpenter | |
| 7,318,477 B2 | * | 1/2008 | Hou | C09K 8/40 |
| | | | | 166/304 |
| 9,512,345 B2 | | 12/2016 | Lende et al. | |
| 10,184,329 B2 | * | 1/2019 | Pietrangeli | E21B 37/00 |
| 2003/0006040 A1 | * | 1/2003 | McGregor | C09K 8/52 |
| | | | | 166/312 |
| 2016/0177169 A1 | * | 6/2016 | Zhang | C09K 8/52 |
| | | | | 507/261 |
| 2018/0346789 A1 | * | 12/2018 | Ali | C09K 8/52 |
| 2018/0346792 A1 | * | 12/2018 | Fu | C09K 8/536 |
| 2019/0093001 A1 | * | 3/2019 | Merli | E21B 37/06 |

* cited by examiner

DRY BLEND PRE-FLUSH AND SPACER PACKAGE AND METHOD FOR MIXING AND INJECTING A PRE-FLUSH AND SPACER ON-THE-FLY TO CLEAN A SUBTERRANEAN WELL

FIELD OF THE INVENTION

The present specification relates generally to drilling of subterranean wells, and more particularly to a dry blended pre-flush and spacer package for creating a pre-flush and spacer used for converting a subterranean well from a substantially non-water-wet condition to a substantially water-wet condition and a method for mixing and injecting the pre-flush and spacer on-site for on-the-fly to clean a subterranean well.

BACKGROUND OF THE INVENTION

The following includes information that may be useful in understanding the present disclosure. It is not an admission that any of the information provided herein is prior art nor material to the presently described or claimed inventions, nor that any publication or document that is specifically or implicitly referenced is prior art.

When drilling a subterranean well (e.g., hydrocarbon producing wells, storage wells, disposal wells, helium wells, mineral wells, etc.), a drilling fluid is constantly circulated through the well to provide lubrication to the drilling head, to clean out any debris from the drilling operation, and to provide back pressure on the geological formation to prevent well collapse. These drilling fluids may be water-based or oil-based. After drilling is complete, a casing or pipe is placed in the well and this casing needs to be supported by cementing it into place. If oil-based drilling fluids are used, the residual oil on the surface of the formation and/or casing may prevent cement from adhering and may cause problems with fluid migration and vent flows around the cement. This would prevent complete geological zonal isolation and make for a problematic well.

Oil-based drilling fluids, or oil-based muds (OBMs) are used for subterranean well drilling in conditions which require high shale inhibition, have high well bore temperatures, and/or require excellent lubrication of the drill string. However, as mentioned above, OBMs present a challenge from a cementing perspective. If cement encounters an oil-wet formation or casing, there will be poor adhesion of the cement, potentially leaving micro annuli for gas migration to occur. Therefore, the well needs to be converted from an "oil-wet" (or substantially non-water-wet) condition to a substantially water-wet condition with a displacement fluid flush, known in the industry as a pre-flush and spacer, prior to any cementing operation.

Current one-part water based pre-flush and spacer packages used for oil well conversion use liquid surfactant products and/or solvents as the primary active ingredients to clean the OBM from the formation. However, there are several issues that arise when using existing liquid-based spacer packages. First, as they are liquid-based, they may potentially freeze in extreme cold, making them unsuitable for use in those conditions, such as found in cold weather regions in winter. The freezing issues can be overcome by addition of freeze suppressing agents, but these increase cost. Second, they need to be mixed on site with water, gellants and density modifying or weighting agents to make the required spacer. This process requires transportation of substantial weights and volumes of materials to the well site, given the liquid composition of the spacer package. For example, 4 $m^3$ of a liquid spacer at a required density of 1600 $kg/m^3$ requires 200 L of the liquid surfactant in the spacer to be mixed with 3.2 tonnes of barite (as an inert weighting agent) on site. Thus, several hours of time are required to supply the required chemical to blend the spacer, representing a substantial cost, as well as increased work risk.

A third issue is that many of the chemicals used in the liquid spacers are volatile, toxic, flammable, or all three. Thus, exposure to the liquid spacers presents a danger to any workers present as well as a potential environmental hazard. A fourth issue is that current industry standards recommends 10 minutes of contact time between the spacer and any particular surface of the well. As modern wells are regularly drilled to multi-kilometer lengths, producing the spacer in sufficient amounts to ensure the contact time standard is met may not be achievable. Weight and size restrictions of pumping units means that mixing tanks larger than 4 $m^3$ on pumping units is difficult. For jobs with recommended volumes greater than 4 $m^3$, multiple batches of 4 $m^3$ of spacer need to be prepared. This increases time on location even more.

Generally speaking, the higher the rate of pumping, the more likely there will be turbulent flow of the pre-flush and spacer which provides better cleaning of the subterranean well. Flow rates in the range of 0.8-1.2 $m^3$/min are common. To maintain such a flow rate, mixing of the pre-flush and spacer needs to occur at high rates as well, which means high shear which in turn is likely to generate more foaming.

It is also preferable that the spacer have a density and viscosity above that of the mud system and below that of the cement system. This means that the spacer method and system needs to be amenable to adjustment of density and viscosity.

Accordingly, there remains a need for improvements in the art to mitigate some or all of the aforementioned issues.

SUMMARY OF THE INVENTION

In accordance with an aspect of the invention, there is provided a dry blended one-part pre-flush and spacer package for creating a water-based pre-flush and spacer used for converting a subterranean well from an oil-wet or substantially non-water-wet condition to a substantially water-wet condition.

According to an embodiment of the invention, there is provided a dry blend pre-flush and spacer package for forming a pre-flush and spacer to clean a subterranean well, comprising: an anionic surfactant; and a builder compound; wherein the dry blend pre-flush and spacer package is mixed on-the-fly with water to form the pre-flush and spacer at a pre-selected density and wherein the pre-flush and spacer, when pumped into the well, converts the well from an oil-wet or substantially non-water-wet condition to a substantially water-wet condition.

According to a further embodiment of the invention, there is provided a method of mixing and injecting a pre-flush and spacer to clean a subterranean well, comprising: providing a dry blend pre-flush and spacer package, the dry blend pre-flush and spacer package comprising: an anionic surfactant; and a builder compound; mixing the dry blend pre-flush and spacer package with water to form the pre-flush and spacer at a pre-selected density; and injecting the pre-flush and spacer into the well while the mixing step continues, and converting the well from an oil-wet or substantially non-water-wet condition to a substantially water-wet condition.

Other aspects and features according to the present application will become apparent to those ordinarily skilled in the art upon review of the following description of embodiments of the invention in conjunction with the accompanying figures.

BRIEF DESCRIPTION OF THE DRAWINGS

Reference will now be made to the accompanying drawings which show, by way of example only, embodiments of the invention, and how they may be carried into effect, and in which.

Like reference numerals indicated like or corresponding elements in the drawings.

DETAILED DESCRIPTION OF THE EMBODIMENTS

The present invention relates generally to subterranean well drilling, and more particularly to a dry blended pre-flush and spacer package 100 for creating a water-based pre-flush and spacer 200 used for converting a well from an oil-wet (or substantially non-water-wet) condition to a water-wet condition and a method for mixing and injecting the dry blended pre-flush and spacer package 200 on-the-fly to clean the well. The dry blend pre-flush and spacer package and method for forming a pre-flush and spacer could also be used to flush out water-based muds (i.e., a substantially non-water-wet condition) if excess asphaltenes/hydrocarbons needed to be removed from the formation in the Athabasca oil sands for example.

A purpose of a pre-flush and spacer in subterranean drilling is to clean the oil from the well and leave the surfaces of the well formation and casing water-wet such that when cement is added it will adhere properly to the surface. If the well formation and casing are still oil-wet, the cement may not adhere properly, leading to gas migration through micro annuli and other potential leakage issues.

Figure 1:
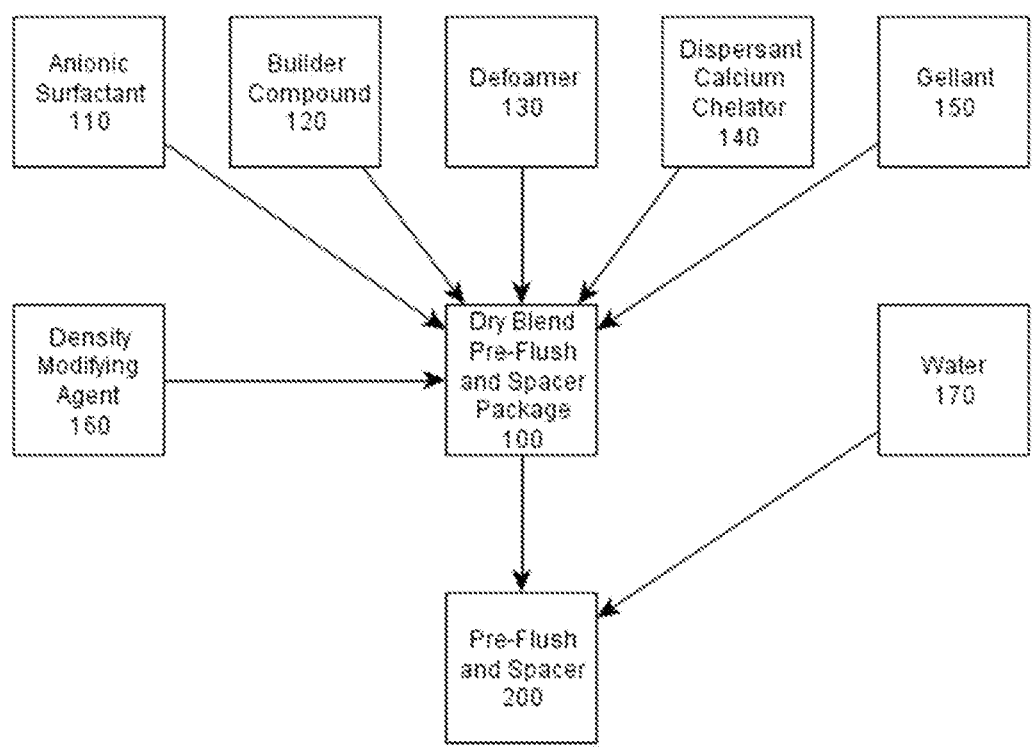
FIG. 1 is a block diagram of the pre-flush and spacer and the dry pre-flush and spacer blending and mixing process according to an embodiment of the invention.

According to an embodiment of the present invention as shown in FIG. 1, a dry blend pre-flush and spacer package 100 is provided for use in mixing with water into a pre-flush and spacer 200 for a subterranean well, such as an oil well although the present invention may be used with other subterranean wells including but not limited to other hydrocarbon-producing wells such as gas or condensates, as well as disposal, water, geothermal, and mineral (e.g., potash) wells. The dry blend pre-flush and spacer package 100 may comprise the following solid components: first, an anionic surfactant such as a detergent, which acts to emulsify and clean the oil-based drilling fluid or oil-based mud (OBM) from the formation and drill. The anionic surfactant 110 may be a composition or combination of compounds, including but not limited to, sodium myreth sulfate, sodium lauryl sulfate (sodium dodecyl sulfate), ammonium lauryl sulfate, sodium laureth sulfate (sodium lauryl ether sulfate), sodium sterate or related compounds known to be useful as anionic divalent ions to improve the efficiency of the surfactant. The builder compound 120 may also increase the pH of the pre-flush and spacer above 7 to accelerate hydration of a gellant if used, as discussed below. The builder compound 120 may be, for example, a basic salt, such as sodium carbonate, soda ash, sodium metasilicate, sodium metasilicate pentahydrate, sodium phosphate, sodium polyphosphates, or a combination thereof or any other compound which acts to chelate or bind calcium or other divalent ions to improve the efficiency of the surfactant. For OBMs, the builder compound 120 may optionally be further combined with a dispersant calcium chelator 140 such as citric acid, tartaric acid, sodium acid pyrophosphate, sodium gluconate, polycarboxylates, sodium phosphates, sodium polyphosphates, organophosphonates, sodium sulfonates (such as polynaphthalene sulfonate, polymelamine sulfonate or lignosulfonates), EDTA or other polycaboxylates. The dispersant calcium chelator acts to improve compatibility of the pre-flush and spacer with the OBM and inhibit formation of a viscous, stable emulsion in the pre-flush and spacer 200.

Additionally, one or more defoamers 130 or anti-foam agents may optionally be added to prevent excessive foaming of the pre-flush and spacer during the mixing process.

A viscosifying agent may also optionally be included, which for a dry blend package may be a solid gellant such as rapidly hydrating gellant 150, such as a hydroxyethyl cellulose (HEC), guar, polyvinylpyrrolidine, carboxymethylcellulose, galactomannans or other suitable viscosifiers may be used to control viscosity to give the desired viscosity and prevent excessive mixing with the cement or OBM, and to prevent the density modifying agent from settling in the pre-flush and spacer 200. The gellant is solid for the dry blend pre-flush and spacer package; however, this does not preclude a liquid gellant also being added to the mixture as the dry blend pre-flush and spacer package is mixed and injected at the subterranean well site.

According to an embodiment, one or more lost-circulation materials comprising insoluble solids such as wood chips, husks, ground rock, plastic flakes and fibres, glass fibres, recycled ground rubber may also be added to the dry blend pre-flush and spacer package 100. These lost-circulation materials help mitigate against fluid losses within the well resulting from porous, cavernous or vulgar formations.

According to an embodiment, the dry blend pre-flush and spacer package 100 may also comprise a density modifying agent 160—an insoluble material such as silica flour, calcium carbonate, hematite, barite, fly ash, or manganese tetroxide 160—such that the pre-flush and spacer 200 attains the desired density for the application, which will depend on the composition of the cement and OBM in use in the subterranean well. Thus, a pre-flush and spacer 200 is prepared which is compatible and suitable for cleaning out both the cement slurry used and the OBM used in the subterranean well.

Of the various choices of density modifying agent, preferably silica flour 160, barite or calcium carbonate is used as the inert weighting agent, as it is cost effective and can be stored and provided by silos, rather than bags, which are used with other weighting agents. Thus, it may be provided more rapidly and fluidly for use in mixing operations.

According to a further embodiment such as where the desired density of the pre-flush and spacer 200 is about 1 kg/L, such as when the mud that the pre-flush and spacer is displacing is substantially unweighted, no density modifying agent 160 is included in the dry blend pre-flush and spacer package 100 and water 170. According to a further embodiment, it is also possible to move to a density under 1 kg/L by the use of density modifiers such as glass microbubbles or microspheres, cenospheres, or foam entrainment with air or nitrogen and a foam stabilizer.

For wells that have zones of high salt content it is possible and advantageous to add high salt content to the dry blend package to achieve salt saturation in the resulting fluid (commonly NaCl up to 37 g/100 mL water and less commonly KCl).

The dry blend pre-flush and spacer package 100 is preferably blended in the desired volume away from the well site, such as at a bulk plant dedicated to blending solids, reducing the transportation and labour requirements as compared to liquid spacers. Further, by proper selection of the chemicals used for the various components of the dry blend pre-flush and spacer package 100, the comparative volatility, toxicity and flammability of the final product may be reduced or even eliminated, reducing risk to crews.

According to the above, several dry blend pre-flush and spacer packages were tested to determine compatibility and efficiency with both cement and OBMs. Results were compared against an existing commercial liquid spacer for reference.

The first dry blend pre-flush and spacer package tested included 15 kg/m$^3$ of surfactant (a combination of sodium tripolyphosphate, sodium carbonate, sodium chloride and sodium myreth sulfate) with 30 kg/m$^3$ of builder compound (sodium metasilicate pentahydrate), 1-7 kg/m$^3$ of gellant (hydroxyethylcellulose polymer), 2 kg/m$^3$ of dispersant calcium chelator (citric acid/tartaric acid) and 4 kg/m$^3$ of defoamer. This was blended with an inert weighting agent (silica flour or calcium carbonate or barite) and water to reach a density of 1150 kg/m$^3$ for testing with a cement having a density of 1200 kg/m$^3$.

A second dry blend pre-flush and spacer package tested included 20 kg/m$^3$ of surfactant (a combination of sodium tripolyphosphate, sodium carbonate, sodium chloride and sodium myreth sulfate) with 5 kg/m$^3$ of builder compound (sodium metasilicate pentahydrate), 1-7 kg/m$^3$ of gellant (hydroxyethylcellulose polymer), 20 kg/m$^3$ of dispersant calcium chelator (sodium acid pyrophosphate) and 6 kg/m$^3$ of defoamer. This was blended with an inert weighting agent (silica flour or calcium carbonate or barite) and water to reach a density of 1600 kg/m$^3$ for testing with a cement having a density of 1650 kg/m$^3$ and an OBM having a density of 1460 kg/m$^3$.

A third dry blend pre-flush and spacer package tested included 30 kg/m$^3$ of surfactant (a combination of sodium tripolyphosphate, sodium carbonate, sodium chloride and sodium myreth sulfate) with 60 kg/m$^3$ of builder compound (sodium metasilicate pentahydrate), 4 kg/m$^3$ of gellant (hydoxyethylcellulose polymer), 5 kg/m$^3$ of dispersant calcium chelator (sodium acid pyrophosphate) and 1.5 kg/m$^3$ of defoamer. This was blended with an inert weighting agent (silica flour) and water to reach a density of 1150 kg/m$^3$ for testing with a cement having a density of 1200 kg/m$^3$.

A fourth dry blend pre-flush and spacer package tested included 30 kg/m$^3$ of surfactant (a combination of sodium tripolyphosphate, sodium carbonate, sodium chloride and sodium myreth sulfate) with 60 kg/m$^3$ of builder compound (sodium metasilicate pentahydrate), 4.5 kg/m$^3$ of gellant (hydroxyethylcellulose polymer), 5 kg/m$^3$ of dispersant calcium chelator (sodium acid pyrophosphate) and 2 kg/m$^3$ of defoamer. This was blended with an inert weighting agent (silica flour or calcium carbonate or barite) and water to reach a density of 1600 kg/m$^3$ for testing with an OBM having a density of 1460 kg/m$^3$.

A fifth dry blend pre-flush and spacer package tested included 20 kg/m$^3$ of surfactant (a combination of sodium tripolyphosphate, sodium carbonate, sodium chloride and sodium myreth sulfate), 5 kg/m$^3$ of builder compound (sodium metasilicate pentahydrate), 4.5 kg/m$^3$ of gellant (hydroxyethylcellulose polymer), 20 kg/m$^3$ dispersant calcium chelator (sodium acid pyrophosphate), 6 kg/m$^3$ defoamer and was blended with inert weighting agent and water to reach 1600 kg/m$^3$ for testing with an OBM having a density of 1450 kg/m$^3$.

In all testing, each of the above dry blend pre-flush and spacer packages, when blended, successfully converted the test bed drill from an oil-wet (or substantially non-water-wet) condition to a substantially water-wet condition and passed both a visual inspection and a fluid compatibility test.

Currently, spacers are typically batch mixed at the subterranean well site. Batch mixing is typically limited to the displacement tank volume of the pressure pumper which is commonly only 4 m$^3$ of spacer which is either mixed in tanks on a truck or using a Batch-O-Matic™ at ground level and then in either case transferred to a pumper tank for subsequent injection into the well. However, 4 m$^3$ of spacer amount of spacer may not be sufficient to achieve a 10-minute contact time with the formation, given that ideal pump rates average 1 m$^3$/min.

In contrast, pre-flushes and spacers according to embodiments of the present invention may be mixed and injected into the subterranean well through a pressure pumper such as a cement pumper. This means that any volume of pre-flush and spacer may be injected or pumped on-the-fly to achieve sufficient well cleaning. Moreover, since a separate batch mixer is no longer needed or used, and by blending the dry blend pre-flush and spacer package in the bulk plant, well cleaning and cementing at the well site can be completed in less time and with less labour thereby reducing the well service provider's cost and their clients' cost through reduced rig down time and additional reduction of on-lease services such as equipment costs and employee time.

Further, it is also advantageous that the equipment footprint on location is reduced if a separate batching system is not used.

According to a further embodiment, any equipment that mixes solids and water (i.e., not just a pressure pumper) may be used to mix the dry blend pre-flush and spacer package with water. And as indicated above, while the mixing operation is preferably carried out on-the-fly at the well site in order to reduce time in performing drilling operations, it should be appreciated that the mixing of the dry pre-flush and spacer package 100 with water could be carried out anywhere including offsite.

Figure 2:
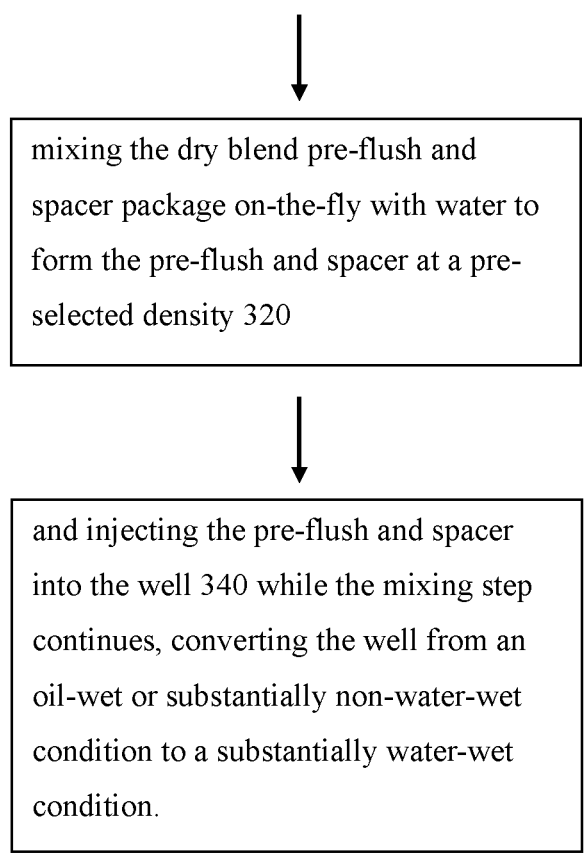
FIG. 2 is a method according to an embodiment of the invention.

According to a preferred embodiment of the invention, mixing is done on-the-fly. Thus, according to an embodiment as shown in FIG. 2, a pre-flush and spacer may be mixed and injected to clean a subterranean well by providing a dry blend pre-flush and spacer package 300, the dry blend pre-flush and spacer package comprising an anionic surfactant, a builder compound, a defoamer, a dispersant calcium chelator, a density modifying agent, a solid gellant, and one or more lost-circulation materials, and then mixing the dry blend pre-flush and spacer package with water to form the pre-flush and spacer at a pre-selected density 320, which may be done on the fly by a pressure pumper; and injecting the pre-flush and spacer into the well 340 while the mixing step continues, converting the well from an oil-wet or substantially non-water-wet condition to a substantially water-wet condition. As described further above, many of the components of the dry blend pre-flush and spacer package are optionally included (a defoamer, a dispersant calcium chelator, a density modifying agent, a solid gellant, and one or more lost-circulation materials) subject to the conditions of the particular subterranean well to be cleaned and potentially any other liquids or solids to be added during mixing or which will be injected contemporaneously with pre-flush and spacer into the subterranean well.

According to an alternative embodiment, the dry blended pre-flush and spacer package 100 may still be used advantageously in batch mixing.

The embodiments of the invention described herein are exemplary and numerous modifications, variations and rearrangements can be readily envisioned to achieve substantially equivalent results, all of which are intended to be embraced within the spirit and scope of the invention. Further, the purpose of the accompanying abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

The present invention may be embodied in other specific forms without departing from the spirit or essential characteristics thereof. Certain adaptations and modifications of the invention will be obvious to those skilled in the art. Therefore, the presently discussed embodiments are considered to be illustrative and not restrictive, the scope of the invention being indicated by the appended claims rather than the foregoing description and all changes which come within the meaning and range of equivalency of the claims are therefore intended to be embraced therein.

What is claimed is:

1. A dry blend pre-flush and spacer package for forming a pre-flush and spacer to clean a subterranean well, comprising:
   an anionic surfactant; and
   a builder compound;
   wherein the dry blend pre-flush and spacer package is mixed on-the-fly with water while being pumped into the well, the mixing being continuously at a pre-selected density, to form the pre-flush and spacer at the pre-selected density and wherein the pre-flush and spacer, when pumped into the well, converts the well from an oil-wet or substantially non-water-wet condition to a substantially water-wet condition.

2. The dry blend pre-flush and spacer package of claim 1, wherein the dry blend pre-flush and spacer package further comprises an inert density modifying agent to form the pre-flush and spacer at the pre-selected density when the dry blend pre-flush and spacer package is mixed with water.

3. The dry blend pre-flush and spacer package of claim 2, wherein the inert density modifying agent comprises one or more of silica flour, barite, flyash, calcium carbonate, hematite, flyash, manganese tetroxide, or glass microbubbles or foam.

4. The dry blend pre-flush and spacer package of claim 1, further comprising a viscosifying agent.

5. The dry blend pre-flush and spacer package of claim 4, wherein the viscosifying agent is a solid gellant.

6. The dry blend pre-flush and spacer package of claim 5, wherein the solid gellant is a rapidly hydrating gellant that comprises one or more of: hydroxyl ethyl cellulose, guar, polyvinylpyrrolidone, carboxymethylcellulose, galactomannans or other viscosifiers.

7. The dry blend pre-flush and spacer package of claim 1, further comprising a defoamer.

8. The dry blend pre-flush and spacer package of claim 1, further comprising a dispersant calcium chelator.

9. The dry blend pre-flush and spacer package of claim 8, wherein the dispersant calcium chelator comprises one or more of: citric acid, tartaric acid, sodium lignosulfonates, sodium salts of citric acid or tartaric acid, sodium acid pyrophosphate, sodium gluconate, polynaphthalene sulfonates, polycarboxylates, or polymelamine sulfonates.

10. The dry blend pre-flush and spacer package of claim 1, wherein the anionic surfactant is a low-foaming surfactant.

11. The dry blend pre-flush and spacer package of claim 1, wherein the anionic surfactant comprises one or more of: sodium myreth sulfate, sodium tripolyphosphate, ammonium lauryl sulfate, sodium lauryl sulfate (sodium dodecyl sulfate), sodium laureth sulfate (sodium lauryl ether sulfate), sodium myreth sulfate, or sodium stearate.

12. The dry blend pre-flush and spacer package of claim 1, wherein the builder compound comprises one or more of: sodium metasilicate, a hydrate of sodium metasilicate, sodium phosphates, sodium polyphosphates, sodium carbonate or soda ash.

13. The dry blend pre-flush and spacer package of claim 1, wherein the pre-flush and spacer composition is suitable for use with both cement slurry and oil-based mud (OBM).

14. The dry blend pre-flush and spacer package of claim 1, further comprising one or more lost-circulation materials.

15. The dry blend pre-flush and spacer package of claim 1, further including a salt.

16. A method of mixing and injecting a pre-flush and spacer to clean a subterranean well, comprising:
   providing a dry blend pre-flush and spacer package, the dry blend pre-flush and spacer package comprising:
   an anionic surfactant; and
   a builder compound;
   mixing the dry blend pre-flush and spacer package with water while being pumped into the well, the mixing being continuously at a pre-selected density, to form the pre-flush and spacer at the pre-selected density; and
   injecting the pre-flush and spacer into the well while the mixing step continues, and converting the well from an oil-wet or substantially non-water-wet condition to a substantially water-wet condition.

17. The method of claim 16, wherein the mixing step and the injecting step are performed by a pressure pumper.

18. The method of claim 16, wherein the dry blend pre-flush and spacer package further comprises an inert density modifying agent to form the pre-flush and spacer at the pre-selected density when the dry blend pre-flush and spacer package is mixed with water.

19. The method of claim 18, wherein the inert density modifying agent comprises one or more of silica flour, barite, flyash, calcium carbonate, hematite, flyash, or manganese tetroxide.

20. The method of claim 16, wherein the dry blend pre-flush and spacer package further comprises a viscosifying agent.

21. The method of claim 20, wherein the viscosifying agent is a solid gellant.

22. The method of claim 21, wherein the solid gellant is a rapidly hydrating gellant that comprises one or more of: hydroxyl ethyl cellulose, guar, polyvinylpyrrolidone, carboxymethylcellulose, galactomannans or other viscosifiers.

23. The method of claim 16, wherein the dry blend pre-flush and spacer package further comprises a defoamer.

24. The method of claim 16, wherein the dry blend pre-flush and spacer package further comprises a dispersant calcium chelator.

25. The method of claim 24, wherein the dispersant calcium chelator comprises one or more of: citric acid, tartaric acid, sodium lignosulfonates, sodium salts of citric acid or tartaric acid, sodium acid pyrophosphate, sodium gluconate, polynaphthalene sulfonates, polycarboxylates, or polymelamine sulfonates.

26. The method of claim 16, wherein the anionic surfactant is a low-foaming surfactant.

27. The method of claim 26, wherein the anionic surfactant comprises one or more of: sodium myreth sulfate, sodium tripolyphosphate, ammonium lauryl sulfate, sodium lauryl sulfate (sodium dodecyl sulfate), sodium laureth sulfate (sodium lauryl ether sulfate), sodium myreth sulfate, or sodium stearate.

28. The method of claim 16, wherein the builder compound comprises one or more of: sodium metasilicate, a hydrate of sodium metasilicate, sodium phosphates, sodium polyphosphates, sodium carbonate or soda ash.

29. The method of claim 16, wherein the pre-flush and spacer composition is suitable for use with both cement slurry and oil-based mud (OBM).

30. The method of claim 16, wherein the dry blend pre-flush and spacer package further comprises one or more lost-circulation materials.

31. The method of claim 16, wherein the dry blend and pre-flush and spacer package further comprises a salt.

32. The method of claim 16, wherein the step of mixing the dry blend pre-flush and spacer package with water to form the pre-flush and spacer at the pre-selected density further comprises mixing the dry blend pre-flush and spacer package with a liquid gellant.

\* \* \* \* \*